(No Model.)
C. BLACK.
WRENCH.
No. 516,182.   Patented Mar. 13, 1894.
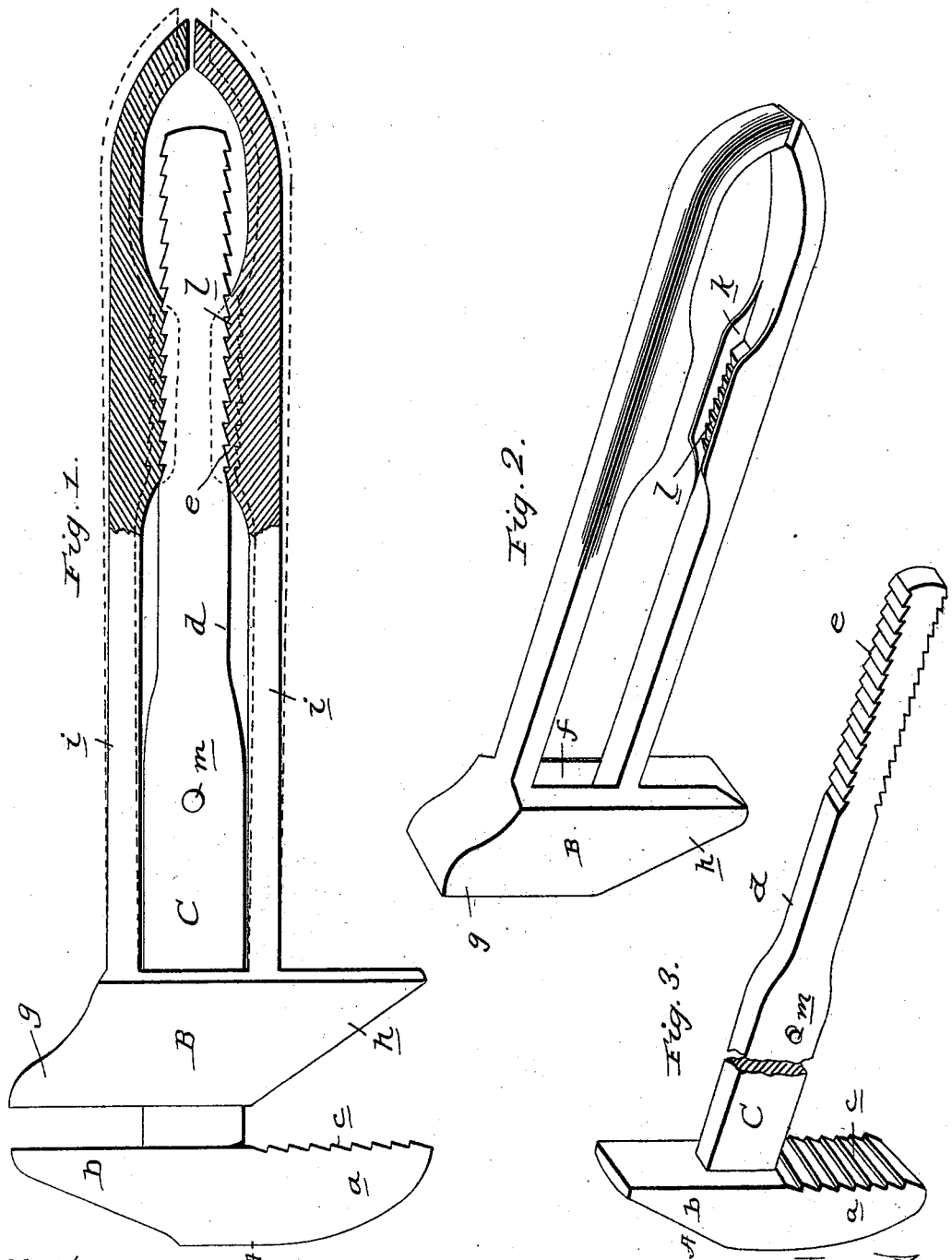
Witnesses:   Inventor
   Christian Black
   By James J. Sheehy
      Attorney

UNITED STATES PATENT OFFICE.

CHRISTIAN BLACK, OF GREEN COVE SPRINGS, FLORIDA.

WRENCH.

SPECIFICATION forming part of Letters Patent No. 516,182, dated March 13, 1894.

Application filed July 5, 1893. Serial No. 479,631. (No model.)

*To all whom it may concern:*

Be it known that I, CHRISTIAN BLACK, a citizen of the United States, residing at Green Cove Springs, in the county of Clay and State of Florida, have invented certain new and useful Improvements in Wrenches; and I do declare the following to be a full, clear, and exact description of the invention, such as will enable others skilled in the art to which it appertains to make and use the same.

This invention has relation to an improvement in nut and pipe wrenches, and it has for its prime object to provide a wrench, at a comparatively small expense, which will permit of a quick and ready adjustment of the jaws, and will dispense with nuts and other means for moving the jaw; the construction being such that the grasp of the operator will hold the jaws in an adjusted position, and by easing the grasp the jaws may be moved and adjusted, as desired.

Other objects and advantages will appear from the following description and claims when taken in connection with the accompanying drawings, in which—

Figure 1, is a plan view of my improved wrench, with a portion of the handle in longitudinal section. Fig. 2, is a perspective view of the outer, slidable jaw and handle, and Fig. 3, is a perspective view of the inner jaw and stem or shank; the latter being partly broken away.

Referring by letter to said drawings: A, indicates the outer head, which in the present embodiment of my invention is provided at one side of its stem or shank C, with a jaw $a$, and on the opposite side of said stem or shank with a jaw $b$, the latter being plain on its inner side, while the former is provided on its inner side, with teeth or serrations $c$. The stem C, which extends centrally from the inner side of the head A, is plain for a portion of its length as shown, and is then reduced in width as shown at $d$, and is provided at its free end on opposite sides with teeth $e$.

B, indicates the inner head. This head is provided centrally with a transverse aperture $f$, and on one side of the aperture is a jaw $g$, which is straight on its side adjacent to the jaw $b$, and on the opposite side of said aperture, is a jaw $h$, which is beveled on its side adjacent to the toothed or serrated jaw $c$. It will thus be seen that I have two straight jaws which will serve effectively as a nut wrench, and I also have a straight toothed jaw to serve in connection with a beveled, plain jaw, as a pipe wrench.

Secured to or formed integral with the head B, are two similar branches $i$, which are disposed longitudinally and receive between them the stem C, of the head A. These branches $i$, are designed to give or yield laterally, and in their normal position they are slightly separated at their outer ends, as illustrated in dotted lines. These branches are recessed at a suitable point in their length on their inner sides, as shown at $k$, and within these recessed portions are teeth $l$, which may be pitched slightly rearwardly in opposite directions to engage the teeth $e$, on the stem or shank C. The jaw or head B, is limited in its opening movement by a stud or lug $m$, extending from the opposite side of the stem C. By allowing the branches $i$, which serve the additional function of handles, an outward, yielding movement at their free ends, it will be seen that in order to fix the position of the jaws, it is simply necessary to press such handles or branches by the grasp of the operator.

In operation it will be seen that by easing the grasp upon the handles or branches $i$, the jaws may be slid apart to the point desired, when by tightening the grasp upon said branches, the teeth on the inner sides of the branches $i$, will be brought into engagement with the teeth on the stem C, and the tighter the grasp of the operator, which is natural, according to the force of the bite upon the article operated upon, the tighter will be the engagement at the toothed portion, and consequently the more securely will be the hold of the jaws.

While I have described specifically and in detail, the parts of the exact construction and combination shown, yet I would have it understood that I do not wish to limit myself to the precise construction, proportion, and combination of the parts, which I have shown, as I am aware that they will permit of modifications, without departing from the spirit of my invention.

Having described my invention, what I claim is—

1. As an improved article of manufacture, a pipe and nut wrench, comprising a head having a stem or shank provided with teeth on opposite sides, a head slidable on said shank or stem and having two yielding branches, provided with teeth on their inner sides and adapted to engage the teeth on said stem, substantially as specified.

2. The improved wrench having the head A, provided with the jaws $a$, and $b$, and the stem or shank C, having a stop, and also having the reduced portion provided with teeth on opposite sides, and the head B, slidable on said stem and provided with the jaws $g$, and $h$, and also provided with the two yielding branches $i$, having the teeth on their inner sides to engage the teeth of said stem, substantially as specified.

3. A wrench comprising a slidable head, having a hollow, internally-toothed, and resilient handle, and a head having a stem or shank passing into the slidable head and handle and having a plain portion to furnish a bearing for the slidable head and prevent a rocking movement thereon and also having teeth to engage those of the handle, substantially as specified.

In testimony whereof I affix my signature in presence of two witnesses.

CHRISTIAN BLACK.

Witnesses:
M. F. GEIGER,
A. B. HANFORD.